United States Patent [19]
Weissfloch et al.

[11] Patent Number: 6,032,690
[45] Date of Patent: Mar. 7, 2000

[54] FLUID DIVERTER SYSTEM

[75] Inventors: Marc Weissfloch, Montreal; Kondandaraman Balasubramanian, Mount Royal, both of Canada

[73] Assignee: Montreal Bronze Foundry Limited, Terrebonne, Canada

[*] Notice: This patent is subject to a terminal disclaimer.

[21] Appl. No.: 09/290,014

[22] Filed: Apr. 8, 1999

Related U.S. Application Data

[63] Continuation-in-part of application No. 09/169,718, Oct. 9, 1998.

[51] Int. Cl.[7] .................................................. F16K 11/10
[52] U.S. Cl. ........................ 137/599; 137/883; 251/331
[58] Field of Search .................................. 137/883, 599, 137/331

[56] References Cited

U.S. PATENT DOCUMENTS

| | | |
|---|---|---|
| D. 362,294 | 9/1995 | Skaer et al. . |
| 2,907,346 | 10/1959 | Fortune ..................................... 137/599 |
| 5,065,794 | 11/1991 | Cheung ..................................... 137/883 |
| 5,273,075 | 12/1993 | Skaer ....................................... 137/883 |
| 5,279,328 | 1/1994 | Linder et al. ............................ 137/599 |
| 5,335,696 | 8/1994 | McKenzie ................................ 137/883 |
| 5,427,150 | 6/1995 | Skaer et al. .............................. 137/883 |
| 5,476,118 | 12/1995 | Yokohama ............................... 137/599 |
| 5,875,817 | 3/1999 | Carter ...................................... 137/599 |

*Primary Examiner*—Denise L. Ferensic
*Assistant Examiner*—John Bastianelli
*Attorney, Agent, or Firm*—Wallenstein & Wagner, Ltd.

[57] ABSTRACT

A fluid diverter system for diverting a flow of fluid from an inlet port to at least a selected one of a plurality of fluid passages includes a bypass passage which is provided between the fluid passages immediately upstream of a pair of closure members. The fluid passages and bypass passage are adapted to produce turbulence at an entrance area of the bypass passage to prevent stagnation of some of the fluid within the fluid diverter system.

30 Claims, 11 Drawing Sheets

FLUID DIVERTER SYSTEM

RELATED APPLICATIONS

This Application is a continuation-in-part of U.S. application Ser. No. 09/169,718 filed on Oct. 9, 1998, pending which is hereby incorporated by reference in its entirety.

BACKGROUND OF THE INVENTION

1. Field of the Invention

The present invention relates to piping systems and, more particularly, pertains to a new fluid diverter system adapted to improve drainage therethrough.

2. Description of the Prior Art

Figure 6A:
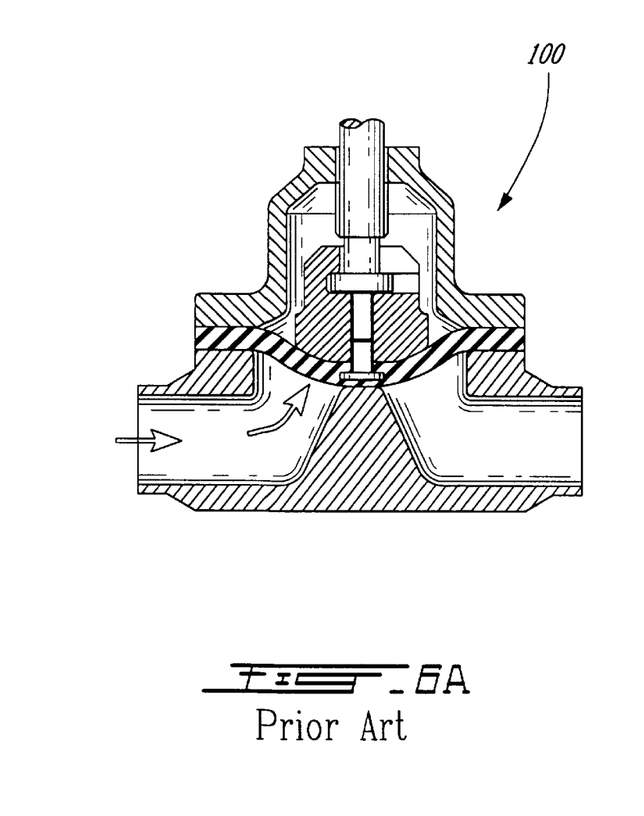
FIGS. 6A and 6B are schematic longitudinal cross-sectional views of a conventional diaphragm valve shown respectively in closed and open positions thereof.
Figure 6B:
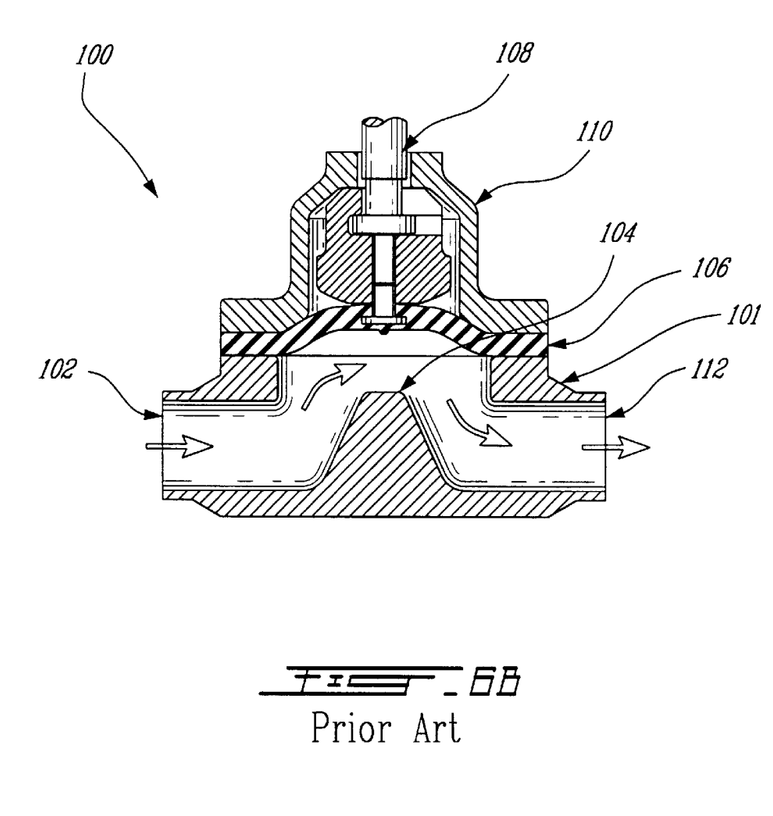

Over the years, various piping systems have been developed to divert or distribute the flow of a wide variety of fluids under various operating conditions. Also known are diaphragm valves, such as the typical diaphragm valve 100 shown in FIGS. 6A and 6B, wherein the valve body 101 has a curved inlet port 102, rising up to a "weir" 104 on which a rubber diaphragm 106 seats and unseats to act as a closing element. The actuation of the diaphragm 106 is normally accomplished by a screw mechanism 108 in a bonnet 110. The valve body 101 defines an outlet port 112. FIG. 6A shows the plunger of the screw mechanism 108 in a lowered position such that the diaphragm 106 sits on the weir 104 thereby closing the valve 100, whereas FIG. 61 illustrates the plunger in a raised position, whereby the valve is open as there is defined a passage between the diaphragm 106 and the weir 104 which allows for fluid communication between the inlet port 102 and the outlet port 112.

In known fluid diverter systems, the flowing medium may be, for instance, diverted by the use of two valves connected to each other by means of a tee branch fitting defining an inlet passage in flow communication with two outlet passages or, alternatively, by the use of a multiported valve, such as a three-way valve. Basically, both systems operate by closing a closure member to block fluid flow through one outlet passage, thereby directing the incoming flow to the other outlet passage. One problem associated with these systems is that some of the fluid remains trapped within the closed outlet passage, upstream of the closure member, thereby giving rise to bacteriological growth and crystallisation of chemical processed media. Obviously, this situation is not acceptable in pharmaceutical, biotech and photo emulsion applications where cleanliness and sterility are essential.

Figure 7:
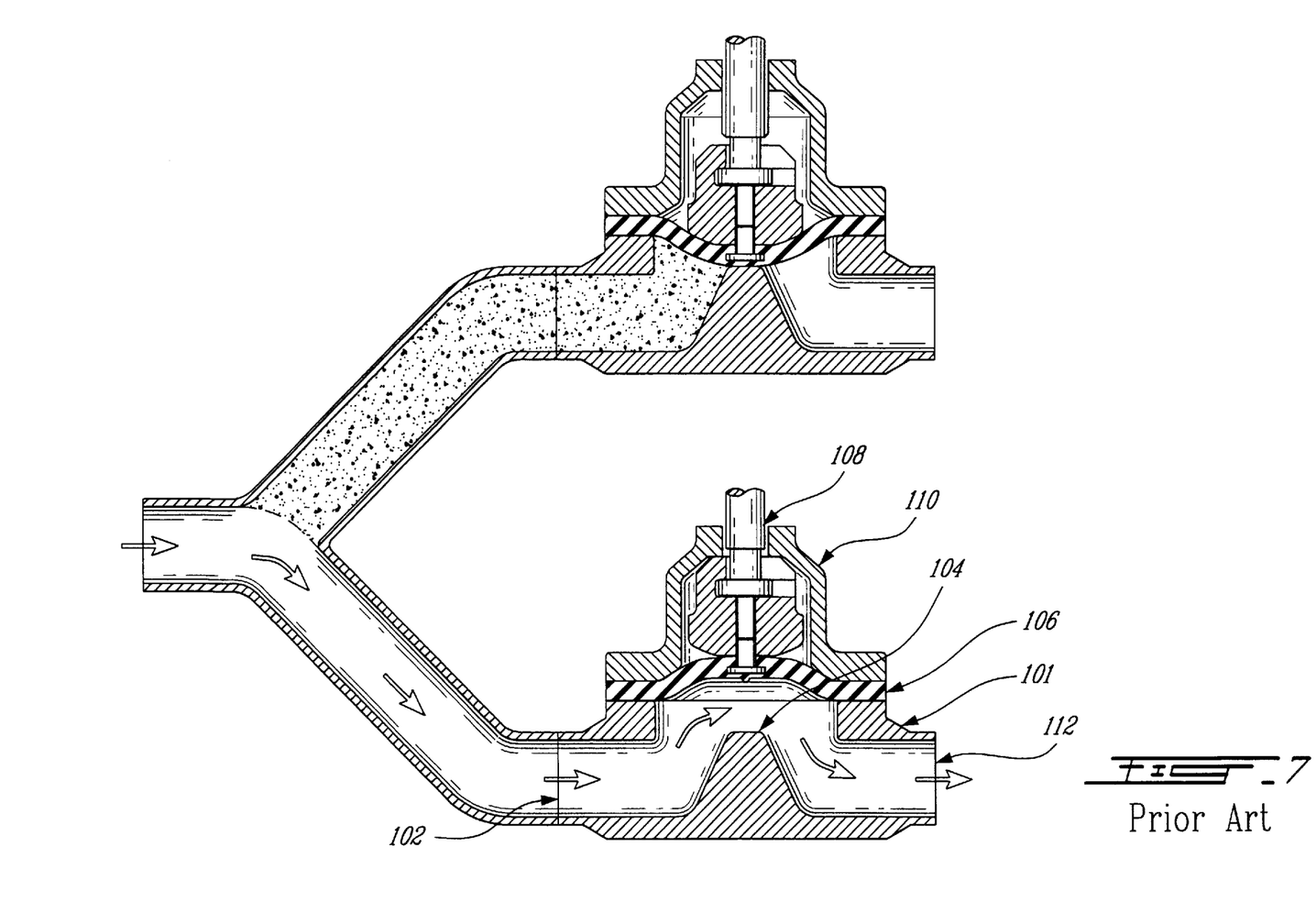
FIG. 7 is a schematic longitudinal cross-sectional view of a conventional fluid diverter system using two diaphragm valves.

In FIG. 7, two diaphragm valves 100 are used to divert the fluid flowing in an inlet pipe 114 to either one of the inlet ports 102 of the diaphragm valves 100. In FIG. 7, the upper valve 100 is closed while the lower valve 100 is open. This arrangement causes dead lag or stagnation of fluid at the inlet side of the closed valve, as indicated by the grey area identified by reference numeral 116 in FIG. 7.

Figure 8:
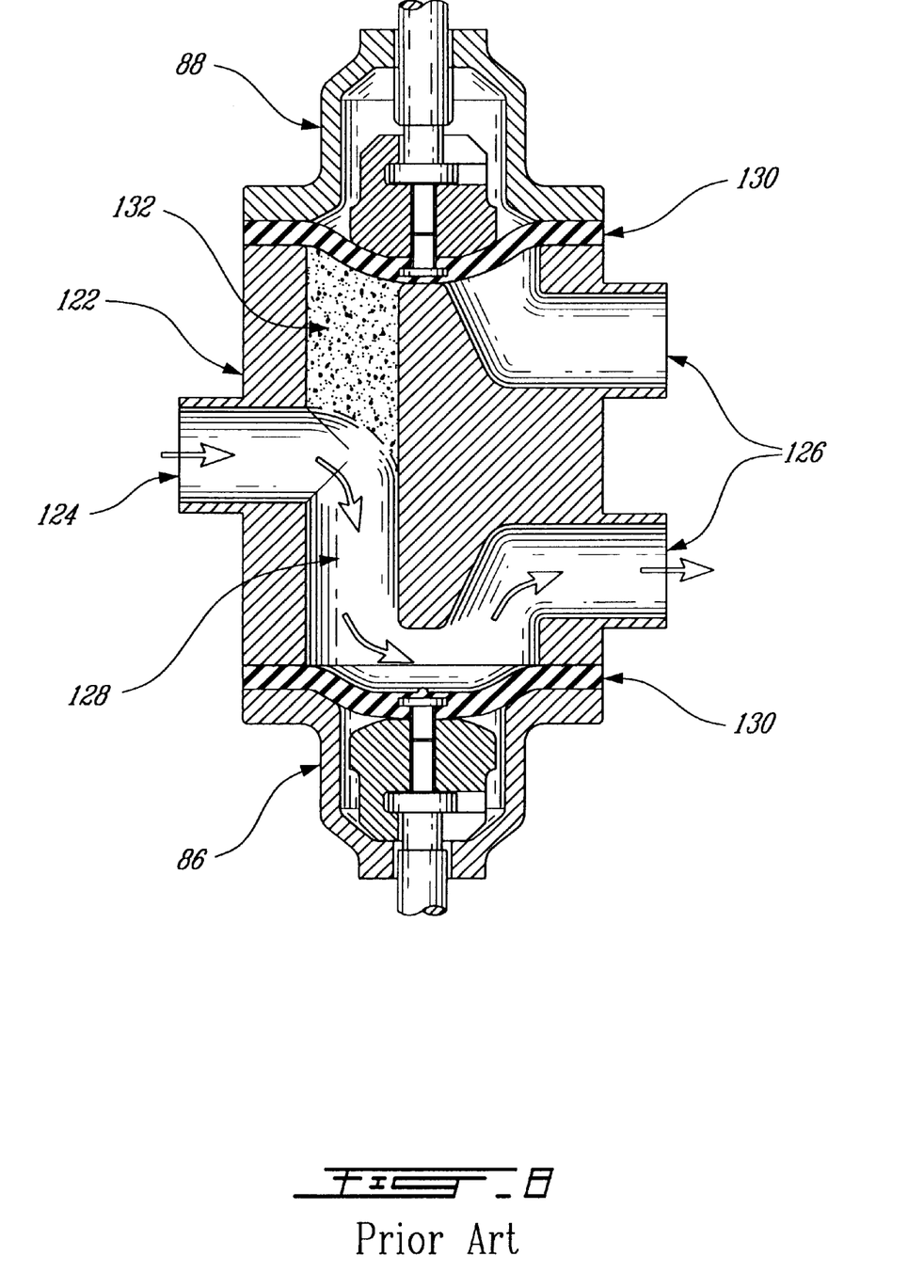
FIG. 8 is a schematic longitudinal cross-sectional view of a conventional diverter valve of the tee inlet port type.

Accordingly, attempts have been made to reduce the amount of stagnant fluid in such diverter piping systems. For instance, U.S. Pat. No. 5,273,075 issued on Dec. 23, 1993 to Skaer and U.S. Pat. No. 5,427,150 issued on Jun. 27, 1995 to Skaer et al. both disclose a multiported diaphragm valve. Such multiported diaphragm valves are schematically represented in FIG. 8, wherein a multiported diaphragm valve 120 comprises a valve body 122 defining an inlet port 124 and two outlet ports 126. The inlet port 124 opens onto a chamber 128 which is in flow communication with both outlet ports 126. A pair of diaphragms 130 are provided for directing the fluid flow emerging from the chamber 128 through one of the two outlet ports 126. This arrangement still leaves a stagnant area upstream of the closed diaphragm, as shown at reference numeral 132 in FIG. 8.

Although the multiported diaphragm valves described in the above mentioned Patents decrease the amount of fluid which remains stagnant in the portion of the closed fluid passage located immediately upstream of the diaphragm associated therewith, it has been found that there is a need for a new multiported valve which is adapted to virtually eliminate the presence of stagnant fluids within the valve.

SUMMARY OF THE INVENTION

It is therefore an aim of the present invention to provide a fluid diverter system which is adapted to improve drainage therethrough.

It is also an aim of the present invention to provide a multiported valve which has a new inlet configuration.

It a further aim of the present invention to provide such a valve which is relatively simple and economical to manufacture.

Therefore, in accordance with the present invention, there is provided a diverter valve comprising a valve body defining flow path means including inlet means and a plurality of passage means located downstream of said inlet means and being in flow communication with said inlet means for dividing an incoming fluid flow into a plurality of separate streams, the passage means operatively communicating with respective outlet means, closure means for directing fluid flow to at least a selected one of said respective outlet means, and bypass passage means provided in said valve body and interconnecting said passage means upstream of said closure means, said flow path means being adapted to create turbulence in the fluid flow at an entry of the fluid in said bypass passage means.

Also in accordance with the present invention, there is provided a fluid diverter system comprising a fluid inlet, a plurality of fluid passage means in flow communication with said fluid inlet and downstream thereof, outlet means in fluid communication with respective ones of said fluid passage means, closure means for directing fluid flow to at least a selected one of said outlet means, and bypass passage means interconnecting said fluid passage means upstream of said closure means, said fluid passage means and said bypass passage means being adapted to create turbulence in the fluid flow at an entry of the fluid in said bypass passage means.

Also in accordance with the present invention, there is provided a fluid diverter system comprising at least one fluid inlet, a plurality of fluid passages in flow communication with the fluid inlet and downstream thereof, outlets in fluid communication with respective ones of the fluid passages, at least one closure for directing fluid flow to at least a selected one of the outlets, and at least one bypass passage interconnecting the fluid passages upstream of the closure, the fluid passages and the bypass passage being adapted to create turbulence in the fluid flow at an entry of the fluid in the bypass passage.

BRIEF DESCRIPTION OF THE DRAWINGS

Having thus generally described the nature of the present invention, reference will now be made to the accompanying drawings, showing by way of illustration a preferred embodiment thereof, and in which.

DESCRIPTION OF THE PREFERRED EMBODIMENTS

Now referring to the drawings, and in particular to FIG. 1, a valve body in accordance with the present invention and generally designated by numeral 10 will be described.

Figure 4:
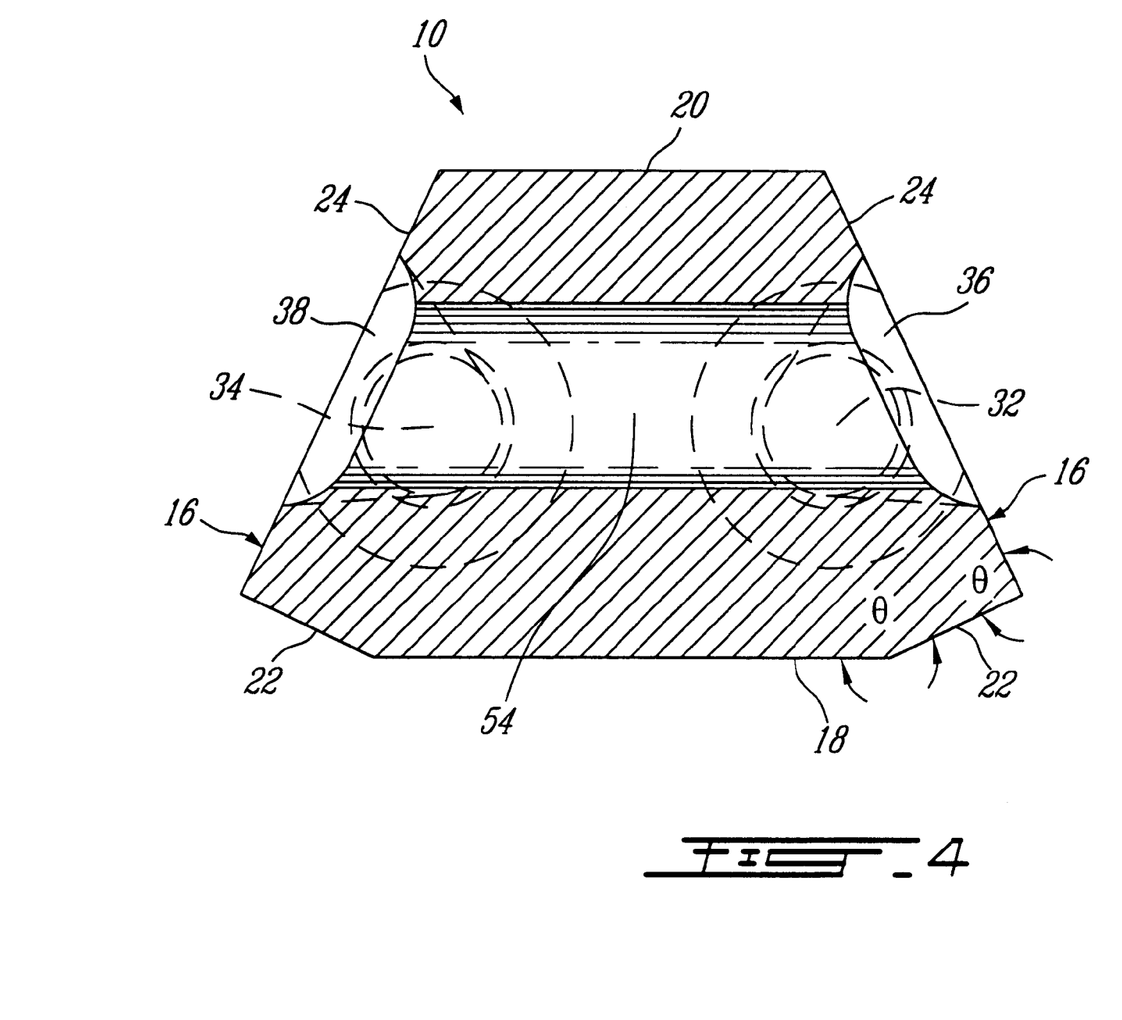
FIG. 4 is a cross-sectional view taken along line 4—4 of FIG. 1.

The valve body 10 comprises a pair of front and rear walls 12 and 14, and a pair of side walls 16 extending between a base portion 18 and a top portion 20. As seen in FIG. 4, each side wall 16 includes a lower portion 22 extending at an obtuse angle θ from the base portion 18 and an upper portion 24 extending at an acute angle Φ from the lower portion 22. It must be noted that the lower portions 22 are not essential and are even absent from most sizes of valve bodies.

Figure 1:
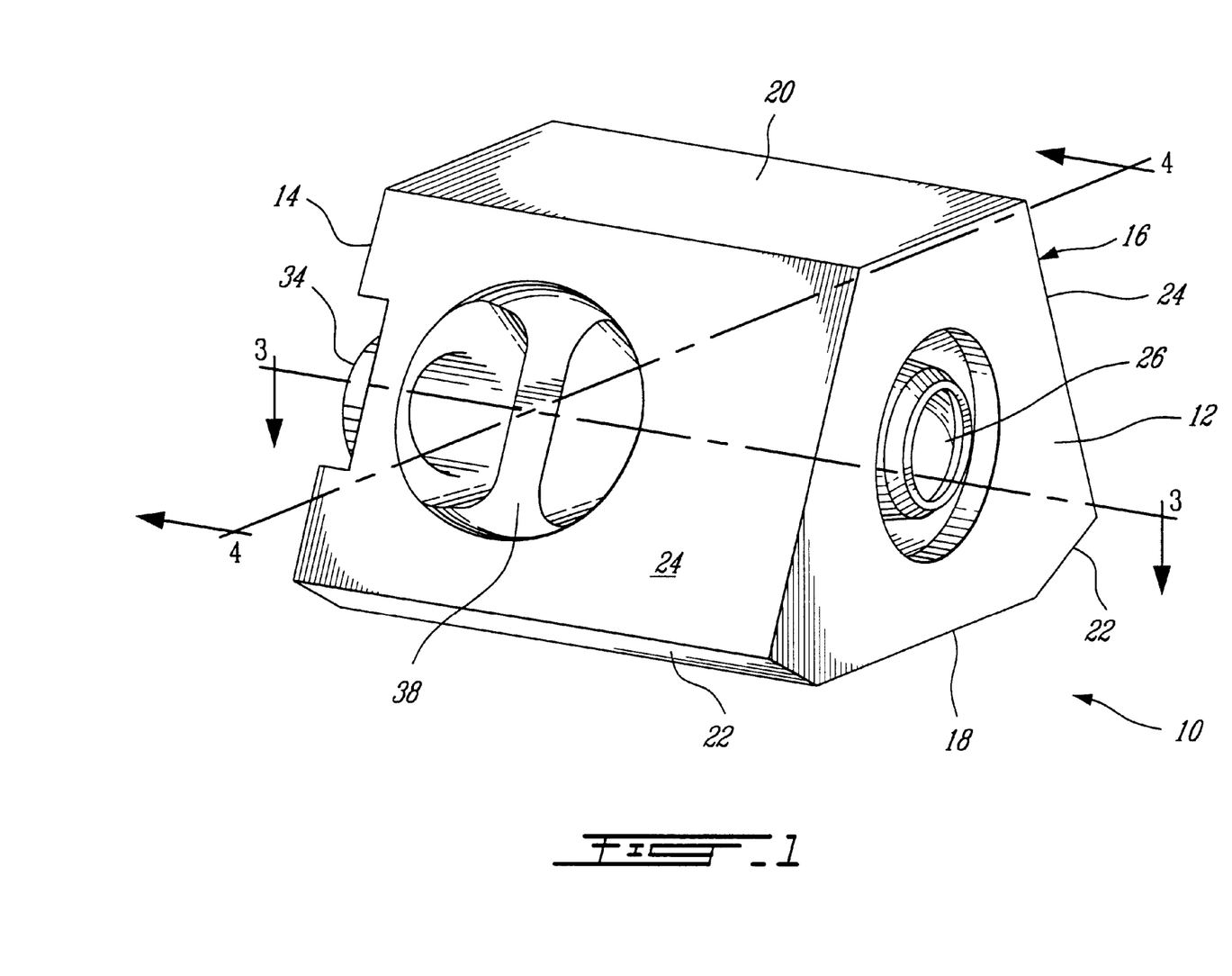
FIG. 1 is a perspective view of a valve body having a fluid passage arrangement in accordance with the present invention.
Figure 2:
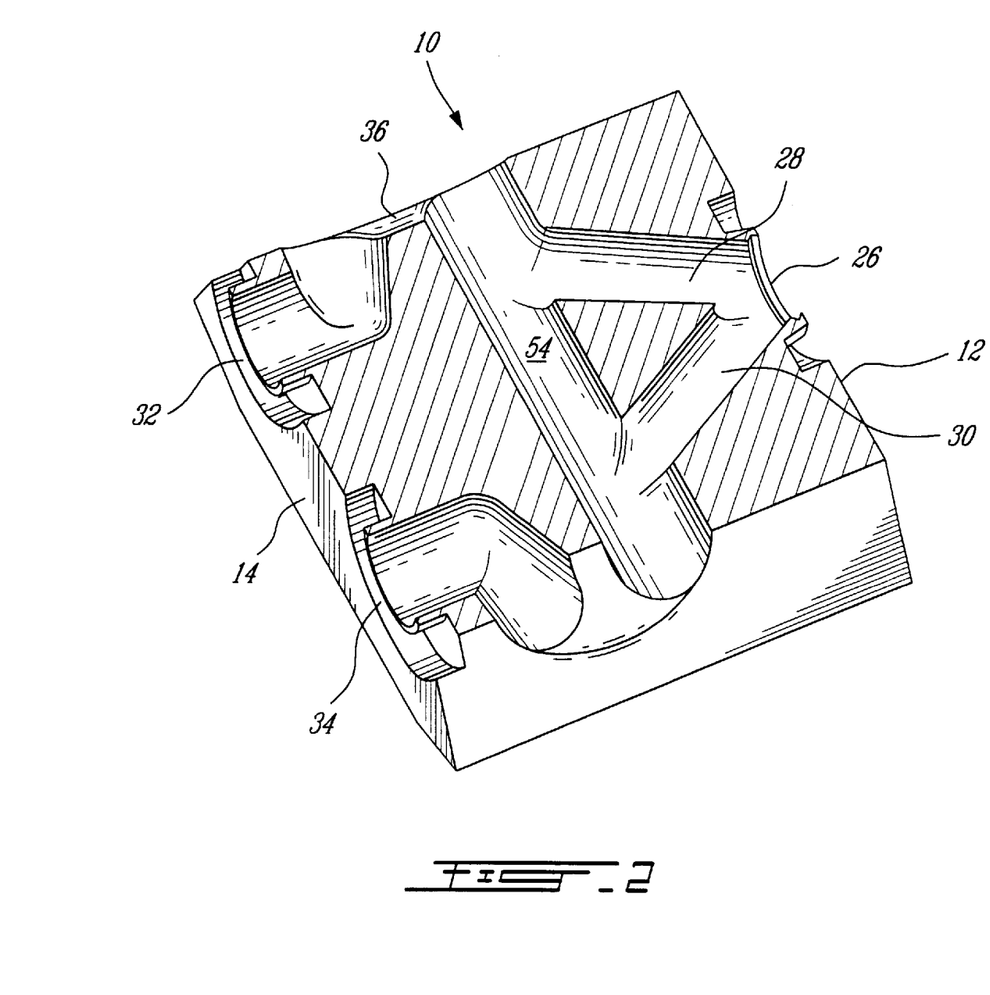
FIG. 2 is a perspective cross-sectional view of the valve body of FIG. 1, showing the fluid passage arrangement thereof.
Figure 3:
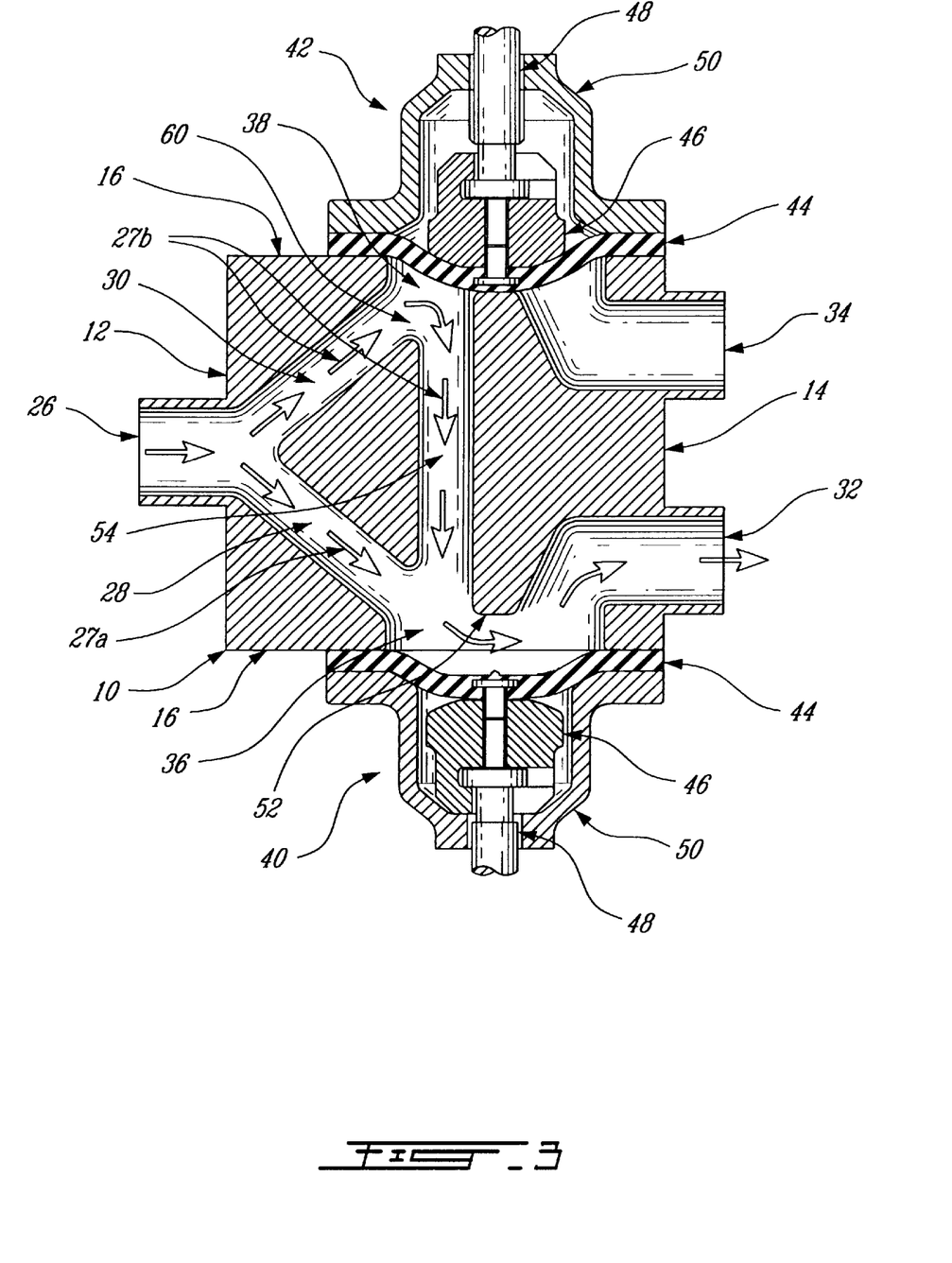
FIG. 3 is a schematic cross-sectional view taken along line 3—3 of FIG. 1, showing a pair of closure members coupled to the valve body thereby forming a multiported diaphragm valve adapted for diverting a fluid flow.

With reference to FIGS. 1 to 3, the front wall 12 defines an inlet port 26 which is adapted to be coupled to a pipe or the like for receiving a fluid flow. The inlet port 26 opens onto first and second diverging fluid passages 28 and 30 defined in the valve body 10 for separating the incoming fluid flow into two separate streams, as illustrated by arrows 27a and 27b in FIG. 3.

The rear wall 14 of the valve body 10 defines first and second outlet ports 32 and 34 which are respectively in flow communication with the first and second fluid passages 28 and 30. It is noted that the inlet port 26 and the outlet ports 32 and 34 may be threaded, flanged or left smooth for welding or provided with other port configurations, depending on the desired coupling to a given piping system.

The first and second fluid passages 28 and 30 are respectively intersected by openings 36 and 38 defined in the side walls 16. First and second closure members 40 and 42 are respectively disposed in the openings 36 and 38 for controlling the fluid flow from the first and second fluid passages 28 and 30 to the outlet ports 32 and 34. More particularly, the closure members 40 and 42 each include a diaphragm 44 which may be mechanically deflected by the pressing action of a conventional compressor 46 mounted at the end of a stem 48 which extends through a bonnet 50.

The first and second fluid passages 28 and 30 each define a weir 52 against which the diaphragm 44 may be pressed to block the fluid flow therethrough, as it is well known in the art. Accordingly, a fluid passing through the inlet port 26 may be directed to one or the other of the first and second outlet ports 32 and 34 by displacing one of the diaphragms 44 to a closed position thereof. For instance, when the second closure member 42 is displaced against the weir 52 of the second fluid passage 30 to block the flow through the second outlet port 34, the fluid flow is diverted toward the first outlet port 32, as illustrated in FIG. 3.

To prevent the accumulation of stagnant fluid within the valve body 10, a bypass passage 54 is defined between the first and second fluid passages 28 and 30. The bypass passage 54 extends across the valve body 10 in the vicinity of the first and second closure members 40 and 42 and, more particularly, immediately upstream of the weirs 52 of the first and second fluid passages 28 and 30. The bypass passage 54 can have a larger, smaller or similar cross-sectional area than that of each of the first and second fluid passages 28 and 30 which are in turn designed to have respective flow coefficients $C_v$ which are less than that of each of the inlet pipe (not shown) connected to the inlet port 26 (on the upstream side thereof) without causing any additional friction. It is noted that the first and second fluid passages 28 and 30 along with the bypass passage 54 each have a generally cylindrical configuration.

Accordingly, for the situation illustrated in FIG. 3, the fluid passing through the inlet port 26 is divided into two separate streams 27a and 27b with stream 27b being directed towards the closed diaphragm 44, namely the second closure member 42. As the flow coefficients $C_v$ for the first and second fluid passages 28 and 30 are less than that of the inlet pipe (not shown), the velocity of the streams 27a and 27b is increased through the first and second fluid passages 28 and 30. Then, stream 27b circulates through the bypass passage 54 into the open passage, in this particular case the first fluid passage 28. The cross-sectional dimensions of the bypass passage 54 cause a decrease or change in the velocity of the stream 27b, thereby creating a small turbulence zone at the junction of the bypass passage 54 and the second fluid passage 30, in the case of FIG. 3. This turbulence zone, in the arrangement of FIG. 3, is located generally in the area designated by reference numeral 60. This ensures a constant flow and a "washing effect" on the closed diaphragm 44, i.e. the second closure member 42.

Although the change of velocity from the first and second fluid passages 28 and 30 to the bypass passage 54 for the above described embodiment is achieved by providing a bypass passage 54 having cross-sectional dimensions which are different from that of the first and second fluid passages 28 and 30, it is understood that this may be also achieved solely by having $C_v$ coefficients for the first and second fluid passages 28 and 30 which are different from that of the bypass passage 54.

It is also noted that the directional change imparted to the fluid flow at the junction of the bypass passage 54 and the second fluid passage 30 may be sufficient to promote turbulence. Alternatively, the shape of the entrance of the bypass passage 54 may be designed to ensure that turbulence in the fluid is created at the junction of the bypass passage 54 and the second fluid passage 30 to thus ensure active flow through the bypass passage 54.

When the outlet port 34 is open and the outlet port 32 is closed, the entrance of the bypass passage 54 is at the junction thereof with the second fluid passage 28, adjacent to the diaphragm 44 (i.e. the closed one), whereat the turbulence occurs.

The above described valve arrangement is particularly well suited for photo emulsion, pharmaceutical and biotech process applications where stagnant media tend to crystallise under the edges of the closed diaphragm 44 thereby altering the operation of the piping system and the quality of the processed media.

Figure 5:
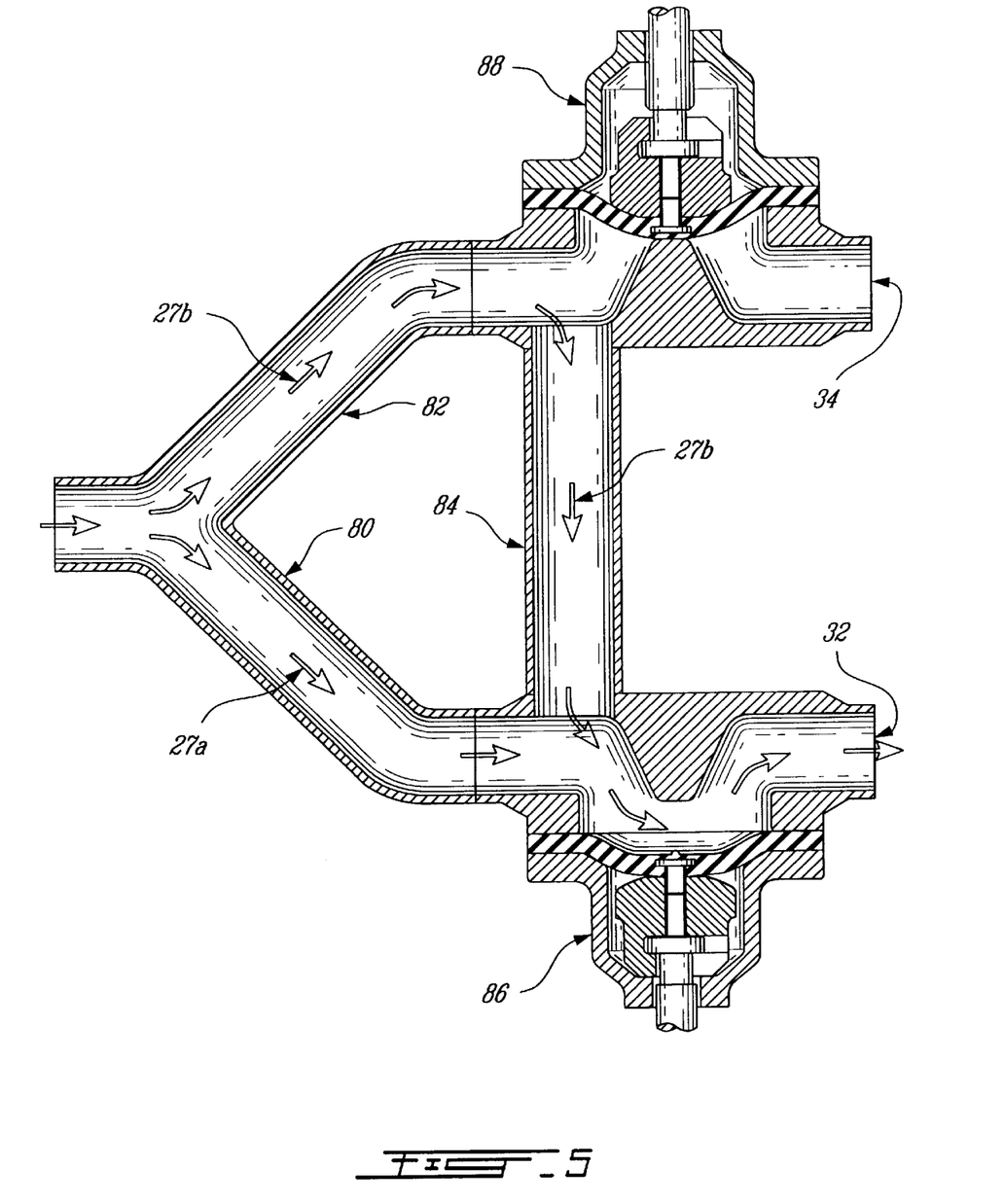
FIG. 5 is a schematic cross-sectional view of a diverter piping system in accordance with a second embodiment of the present invention.

FIG. 5 illustrates a second embodiment of the present invention wherein the first and second fluid passages 28 and 30 and the bypass passage 54 are provided in the form of tubular conduits 80, 82 and 84 instead of being defined in a unique valve body. A pair of valves 86 and 88 are provided for blocking or allowing the flow of fluid through the first fluid passage 80 and the second fluid passage 82, respectively. For illustrative purposes, valve 88 is closed, whereas valve 86 is opened.

Figure 9:
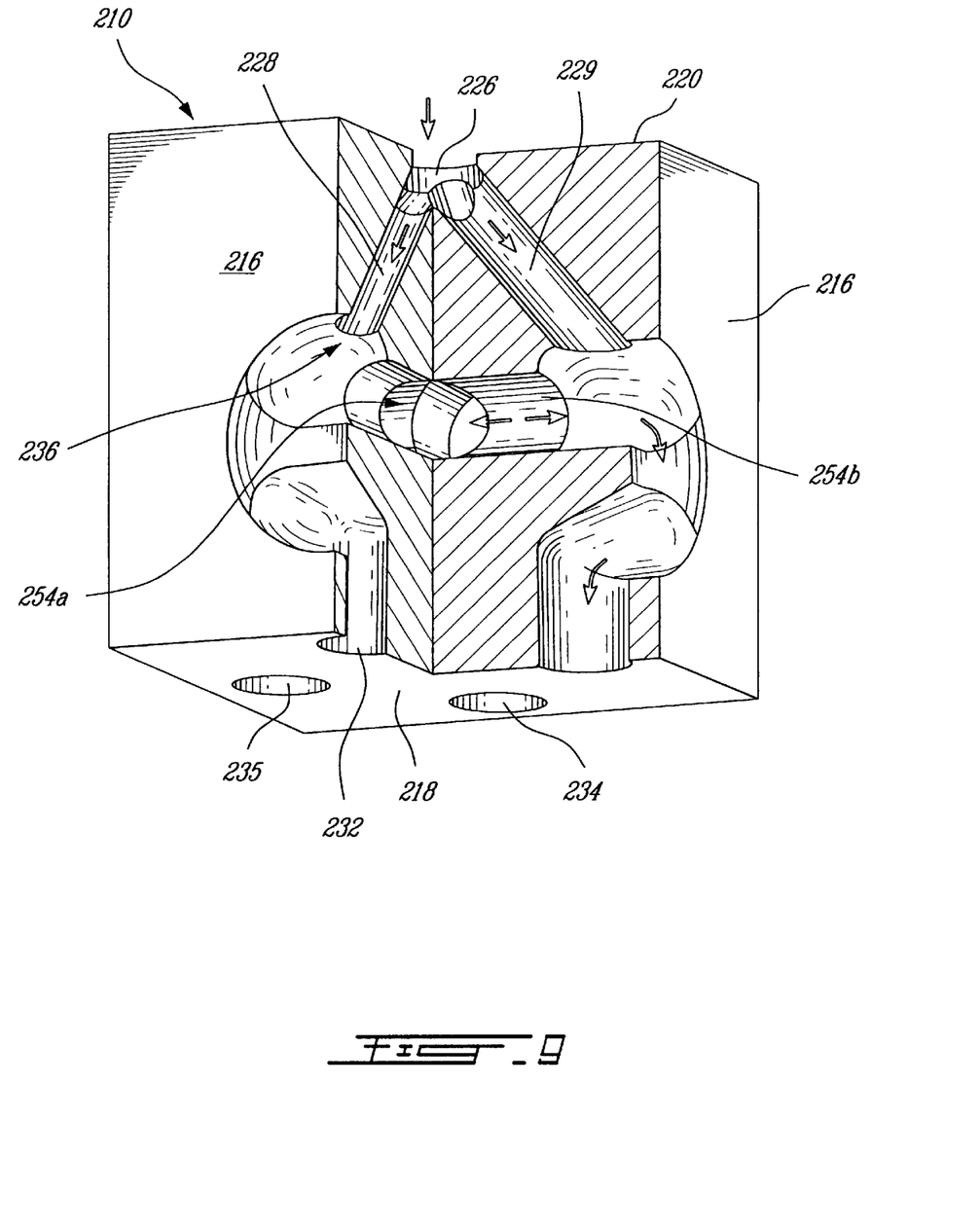
FIG. 9 is a schematic perspective view of a valve body of a four way diverter valve in accordance with a third embodiment of the present invention.

FIG. 9 illustrates a third embodiment of the present invention adapted to divide an incoming flow into four separate streams. More specifically, the valve body 210 is provided in the form of a cube and includes four side walls 216, a bottom wall 218 and a top wall 220. An inlet port 226 is defined in the top wall 220 for receiving an incoming flow. As seen from FIGS. 9 to 11, the inlet port 226 opens to first, second, third and fourth diverging fluid passages 228, 229, 230 and 231 for respectively directing the incoming flow to first, second, third and fourth outlet ports 232, 233, 234 and 235 defined in the bottom wall 218.

Figure 10:
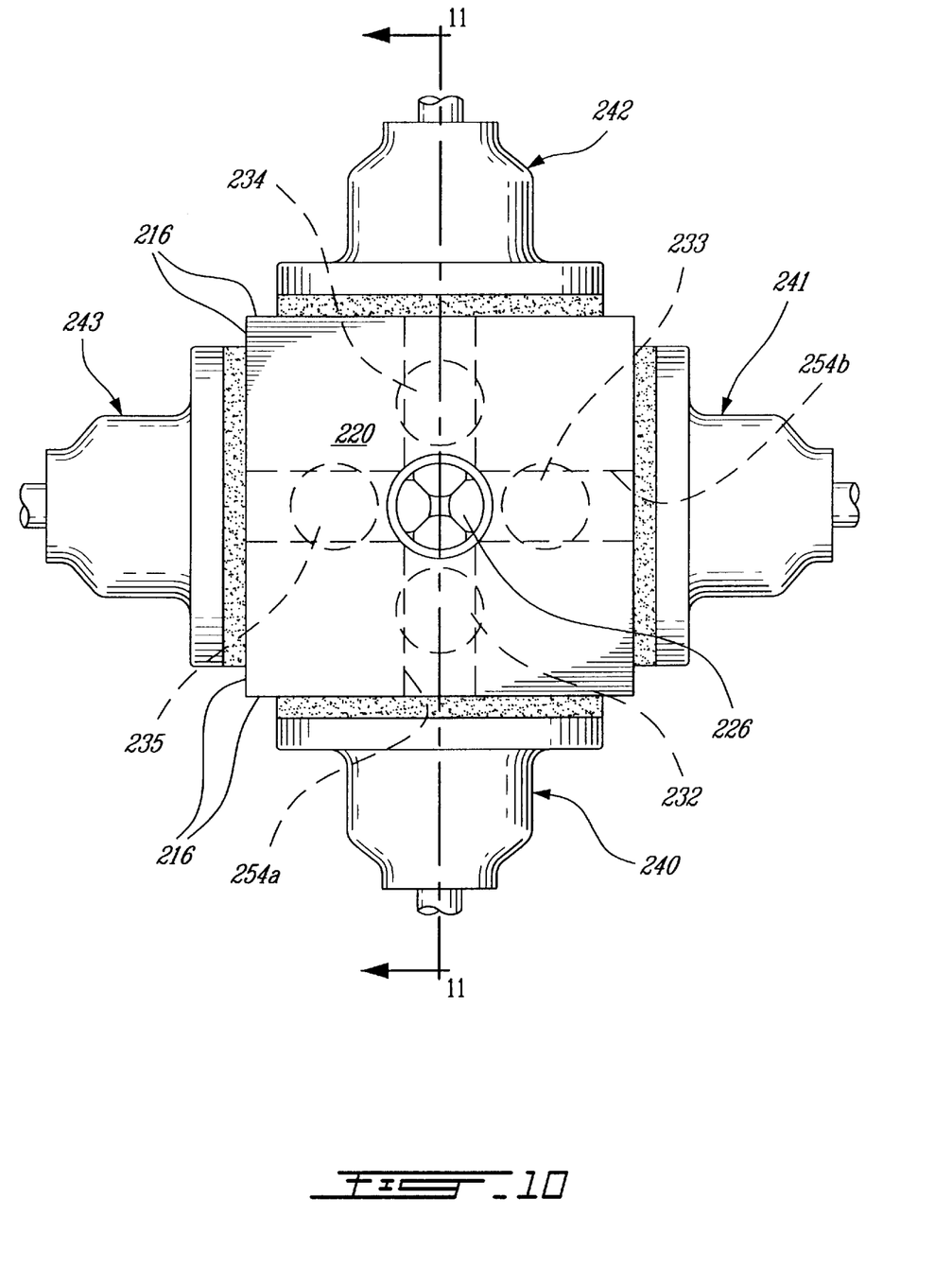
FIG. 10 is a schematic top plan view of the four way valve.
Figure 11:
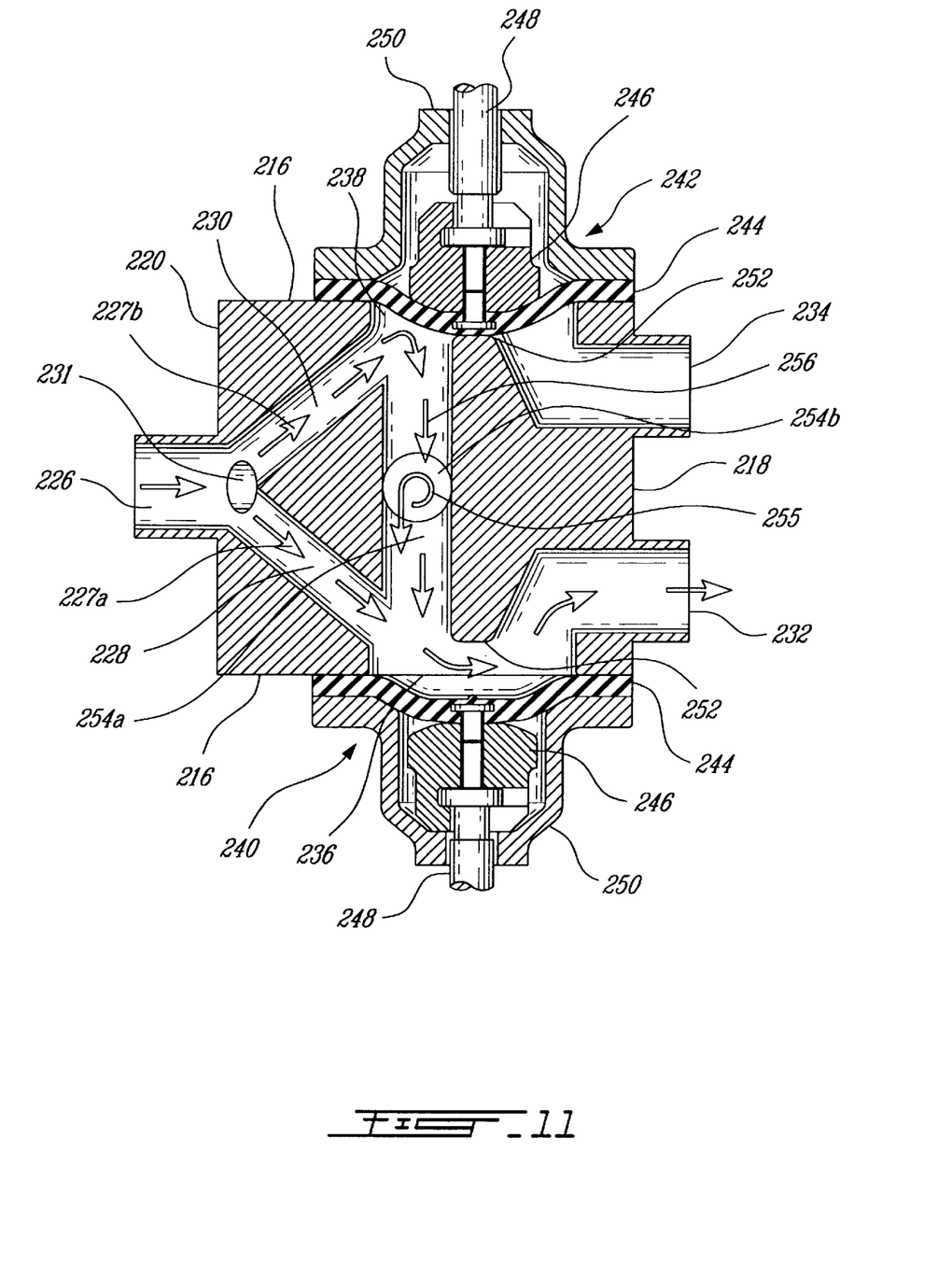
FIG. 11 is a cross-sectional view taken along line 11—11 of FIG. 10.

The first, second third and fourth diverging fluid passages 228, 229, 230 and 231 are respectively intersected by first, second, third and fourth openings (the first and third of which are illustrated in FIG. 11 at 236 and 238) defined in the side walls 216. As seen in FIG. 10, first, second, third and fourth closure members 240, 241, 242 and 243 are respectively disposed in the first opening 236, the second opening (not shown), the third opening 238 and the fourth opening (not shown) for controlling the fluid flow from the inlet port 226 to the first, second, third and fourth outlet ports 232, 233, 234 and 235.

As seen from FIGS. 9 to 11, first and second intersecting bypass passages 254a and 254b extend in a same plane in a "X" configuration within the valve body 210, respectively between the first and third diverging fluid passages 228 and 230 and the second and fourth diverging fluid passages 229 and 231. The first and second bypass passages 254a and 254b are disposed immediately upstream of the closure members 240, 241, 242 and 243 and are adapted to prevent the accumulation of stagnant fluid within the valve body 210, as explained hereinbefore with respect to the first embodiment illustrated in FIGS. 1 to 4.

As seen in FIGS. 10 and 11, the bypass passages 254a and 254b are bored in the valve body 210 so as to intersect at a central area thereof.

When only the first closure member 240 is opened, as illustrated in FIG. 11, the fluid passing through the inlet port 226 is divided into four separates streams, two of which are illustrated at 227a and 227b with stream 227b being directed towards the closed diaphragm 244 of the third closure member 242 and being redirected thereby such as to flow (as per arrow 256) along the first bypass passage 254a and towards the first opening 236 where it mixes with stream 227a. The two other non-illustrated streams are respectively directed towards the closed second and fourth closure members 241 and 243. Then, the two non-illustrated streams circulate through the second bypass passage 254b into the first bypass passage 254a, as illustrated by arrow 255, along with the stream 227b and to the open passage, that is in this particular case the first diverging fluid passage 228, before flowing out of the valve body 210 with the first stream 227a through the first outlet port 232.

The above arrangement ensures a constant flow on respective diaphragms 244 of the closed closure members, i.e. the second, third and fourth closure members 241, 242 and 243.

From the above, it is understood that the above two and four way valve designs could be extended to any multiple of two ported valves or multi-way diverter systems. Also, it is contemplated to have an odd number of ports; for instance, in a three-way valve, there could be three bypass passages joining in succession the ends of the three diverging passages defined downstream of the inlet port. In such a configuration, the bypass passages would not intersect and would define a triangular disposition along a plane normal to, and spaced downstream of, the inlet port. As with valves having an even number of ports, the bypass passages may take different dispositions and orientations than those described herein.

The present invention can thus be embodied in valves having a plurality, that is two or more, of fluid passages defined downstream from the inlet port.

What is claimed is:

1. A diverter valve comprising a valve body defining flow path means including inlet means and a plurality of passage means located downstream of said inlet means and being in flow communication with said inlet means for dividing an incoming fluid flow into a plurality of separate streams, said passage means operatively communicating with respective outlet means, closure means for directing fluid flow to at least a selected one of said outlet means, and bypass passage means provided in said valve body and interconnecting said passage means upstream of said closure means, said flow path means being adapted to create turbulence in the fluid flow at an entry of the fluid in said bypass passage means.

2. A diverter valve as defined in claim 1, wherein the fluid enters in said bypass passage means at a location contiguous to said closure means.

3. A diverter valve as defined in claim 1, wherein said bypass passage means is adapted to change a velocity of a fluid flowing therethrough.

4. A diverter valve as defined in claim 3, wherein said bypass passage means defines a cross-sectional flow area which is different from that of said passage means.

5. A diverter valve as defined in claim 1, wherein said passage means have respective flow coefficients $C_v$ which are different from that of said bypass passage means.

6. A diverter valve as defined in claim 1, wherein said bypass passage means include at least one entry area which is shaped such as to impart turbulence to the fluid flow passing therethrough.

7. A diverter valve as defined in claim 1, wherein said closure means include a plurality of closure members adapted to selectively block fluid flow through respective ones of said passage means.

8. A diverter valve as defined in claim 7, wherein each said closure member includes a diaphragm displaceable between open and closed positions by operation of a pressure member.

9. A diverter valve as defined in claim 8, wherein each of said passage means defines a weir against which said diaphragm may be pressed in said closed position.

10. A diverter valve as defined in claim 9, wherein said bypass passage means is located immediately upstream of said weir of each of said passage means.

11. A diverter valve as defined in claim 1, wherein said flow path means include an even number of passage means.

12. A diverter valve as defined in claim 11, wherein said flow path means include first and second passage means, said first and second passage means being in fluid communication via said bypass passage means extending therebetween.

13. A diverter valve as defined in claim 11, wherein said flow path includes first, second, third and fourth passage means, and wherein said bypass passage means includes first and second intersecting bypass passages extending respectively between said first and third passage means and between said second and fourth passage means.

14. A diverter valve as defined in claim 13, wherein said first and second bypass passages extend in a common plane and are disposed in a cross-shaped configuration.

15. A fluid diverter system comprising a fluid inlet, a plurality of fluid passage means in flow communication with said fluid inlet and downstream thereof, outlet means in fluid communication with respective ones of said fluid passage means, closure means for directing fluid flow to at least a selected one of said outlet means, and bypass passage means interconnecting said fluid passage means in flow communication to one another upstream of said closure means, said fluid passage means and said bypass passage means being adapted to create turbulence in the fluid flow at an entry of the fluid in said bypass passage means.

16. A fluid diverter system as defined in claim 15, wherein the fluid enters into said bypass passage means at a location contiguous to said closure means.

17. A fluid diverter system as defined in claim 15, wherein said fluid inlet, said fluid passage means and said bypass passage means are defined in a unitary valve body.

18. A fluid diverter system as defined in claim 15, wherein said bypass passage means is adapted to change a velocity of a fluid flowing therethrough.

19. A fluid diverter system as defined in claim 18, wherein said bypass passage means defines a cross-sectional flow area which is different from that of said fluid passage means.

20. A fluid diverter system as defined in claim 15, wherein said fluid passage means have respective flow coefficients $C_v$ which are different from that of said bypass passage means.

21. A fluid diverter system as defined in claim 15, wherein said bypass passage means include at least one entrance area which is shaped such as to impart turbulence to the fluid flow passing therethrough.

22. A fluid diverter system as defined in claim 17, wherein said closure means include a plurality of closure members adapted to selectively block fluid flow through respective ones of said fluid passage means.

23. A fluid diverter system as defined in claim 22, wherein each closure member includes a diaphragm displaceable between open and closed positions by operation of a pressure member.

24. A fluid diverter system as defined in claim 23, wherein each of said fluid passage means defines a weir against which said diaphragm may be pressed in said closed position.

25. A fluid diverter system as defined in claim 24, wherein said bypass passage means is located immediately upstream of said weir of each of said fluid passage means.

26. A fluid diverter system as defined in claim 15, wherein an even number of fluid passage means is provided.

27. A fluid diverter system as defined in claim 26, wherein said fluid passage means include first and second fluid passages, said first and second fluid passages being in fluid communication via said bypass passage means extending therebetween.

28. A fluid diverter system as defined in claim 26, wherein said fluid passage means include first, second, third and fourth fluid passages, and wherein said bypass passage means include first and second intersecting bypass passages extending respectively between said first and third fluid passages and between said second and fourth fluid passages.

29. A fluid diverter system as defined in claim 28, wherein said first and second bypass passages extend in a common plane and are disposed in a cross-shaped configuration.

30. A fluid diverter system comprising at least one fluid inlet, a plurality of fluid passages in flow communication with said fluid inlet and downstream thereof, outlets in fluid communication with respective ones of said fluid passages, at least one closure for directing fluid flow to at least a selected one of said outlets, and at least one bypass passage interconnecting said fluid passages in flow communication to one another upstream of said closure, said fluid passages and said bypass passage being adapted to create turbulence in the fluid flow at an entry of the fluid in said bypass passage.

\* \* \* \* \*

UNITED STATES PATENT AND TRADEMARK OFFICE
CERTIFICATE OF CORRECTION

PATENT NO. : 6,032,690
DATED : March 7, 2000
INVENTOR(S) : Marc Weissfloch; Kondandaraman Balasubramanian It is certified that errors appear in the above-identified patent and that said Letters Patent is hereby corrected as shown below:

On the title page, Item
[30]   Foreign Application Priority Data
       October 6, 1998 (CA) Canada............2,249,815

Signed and Sealed this

Second Day of January, 2001

Attest:

Q. TODD DICKINSON

*Attesting Officer*   *Commissioner of Patents and Trademarks*